United States Patent [19]
Rabii

[11] Patent Number: 5,367,212
[45] Date of Patent: Nov. 22, 1994

[54] GEOMETRY CORRECTION WAVEFORM SYNTHESIZER

[75] Inventor: Khosro M. Rabii, Arlington Heights, Ill.

[73] Assignee: Zenith Electronics Corp., Glenview, Ill.

[21] Appl. No.: 969,866

[22] Filed: Oct. 30, 1992

[51] Int. Cl.⁵ .............................................. H03L 7/16
[52] U.S. Cl. .................... 327/105; 315/370; 327/133; 327/317; 327/306
[58] Field of Search ............... 307/261, 264, 493, 529; 328/14, 156, 168

[56] References Cited

U.S. PATENT DOCUMENTS

| | | | |
|---|---|---|---|
| 3,825,796 | 7/1974 | Bello | 307/228 |
| 3,997,845 | 12/1976 | Wegstedt | 328/156 |
| 4,403,199 | 9/1983 | Blackmer | 307/493 |

*Primary Examiner*—Timothy P. Callahan
*Assistant Examiner*—Dinh Le

[57] ABSTRACT

A geometry correction waveform synthesizer includes a plurality of DC controlled multipliers each coupled to respective sources of complimentary geometry correction signals. The DC controlled multipliers are coupled to respective gain control voltage sources as well as null adjustment voltage sources to provide a variable amplitude and polarity correction signal output. The individual correction signal outputs of the DC controlled multipliers are combined to form a composite geometry correction signal which is applied to a gain control circuit. The individual gain control signals used by the DC controlled multipliers are added to form a combined gain control signal which is used to control the composite correction signal amplitude and maintain correction signal amplitude within a predetermined range. An overall gain control couples the composite geometry correction signal to the scan system.

16 Claims, 2 Drawing Sheets 5,367,212

GEOMETRY CORRECTION WAVEFORM SYNTHESIZER

FIELD OF THE INVENTION

This invention relates generally to cathode ray tube display systems and particularly to geometry correction systems used therein.

BACKGROUND OF THE INVENTION

The raster scan system used in most television and computer monitor cathode ray tube displays provides horizontal and vertical scanning in what is ideally a generally rectangular linear scan pattern. In most displays, the horizontal scan system runs at a substantially greater frequency than the vertical scan system providing a plurality of sequential vertically displaced horizontal scan lines which fill out a complete raster scan of the display. Several practical considerations and limitations provide obstacles to the completely linear uniform scanning of the cathode ray tube. For example, the basic geometry of cathode ray tube themselves creates geometric distortions in that the faceplate generally defines a radius of curvature which is substantially greater than the distance than the scanned CRT faceplate and the effective center of deflection or bending of the scanning electron beams. This is particularly true of cathode ray tubes used in computer monitors which provide flat or nearly flat display screens. In addition to basic geometry problems found in the cathode ray tube itself, the deflection scanning systems of the display are seldom, if ever, perfectly linear and thus create nonlinearity themselves which contribute to the overall lack of linearity and correct geometry of the raster scan.

These geometry problems give rise to a variety of distortions which, for example, includes the well known pincushion distortion, barrel distortion and trapezoidal or keystone distortion. To correct such problems, practitioners in the art have provided systems which develop geometry correction signals. Such correction signals are provided at either or both the horizontal and vertical scan rates and are used to modify the deflection system scan signals and achieve correction.

For example, the above-mentioned pincushion correction is compensated or corrected by imposing a vertical rate amplitude change upon the horizontal scan drive signal amplitude which is minimal at the top and bottom of the raster and maximum at the center. Barrel distortion is the converse of pincushion distortion and is corrected by applying a vertical rate amplitude change upon the horizontal scan system which is maximum at the top and bottom of the raster and minimum at the center. Similar corrections are derivable for other geometric distortions. In most display systems and in particular the exacting art of computer monitor displays, a single correction is insufficient and a number of corrections simultaneously operative are required to achieve a linear or nearly linear display. Such systems have been provided and have enjoyed different levels of success. However, such correction systems are often complex and subject to their own limitations as to linearity and signal handling capability. Thus, there remains a continuing need in the art for evermore improved and effective geometry correction systems for cathode ray tube displays.

Accordingly, it is a general object of the present invention to provide an improved geometry correction system. It is a more particular object of the present invention to provide an improved geometry correction waveform synthesizer.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
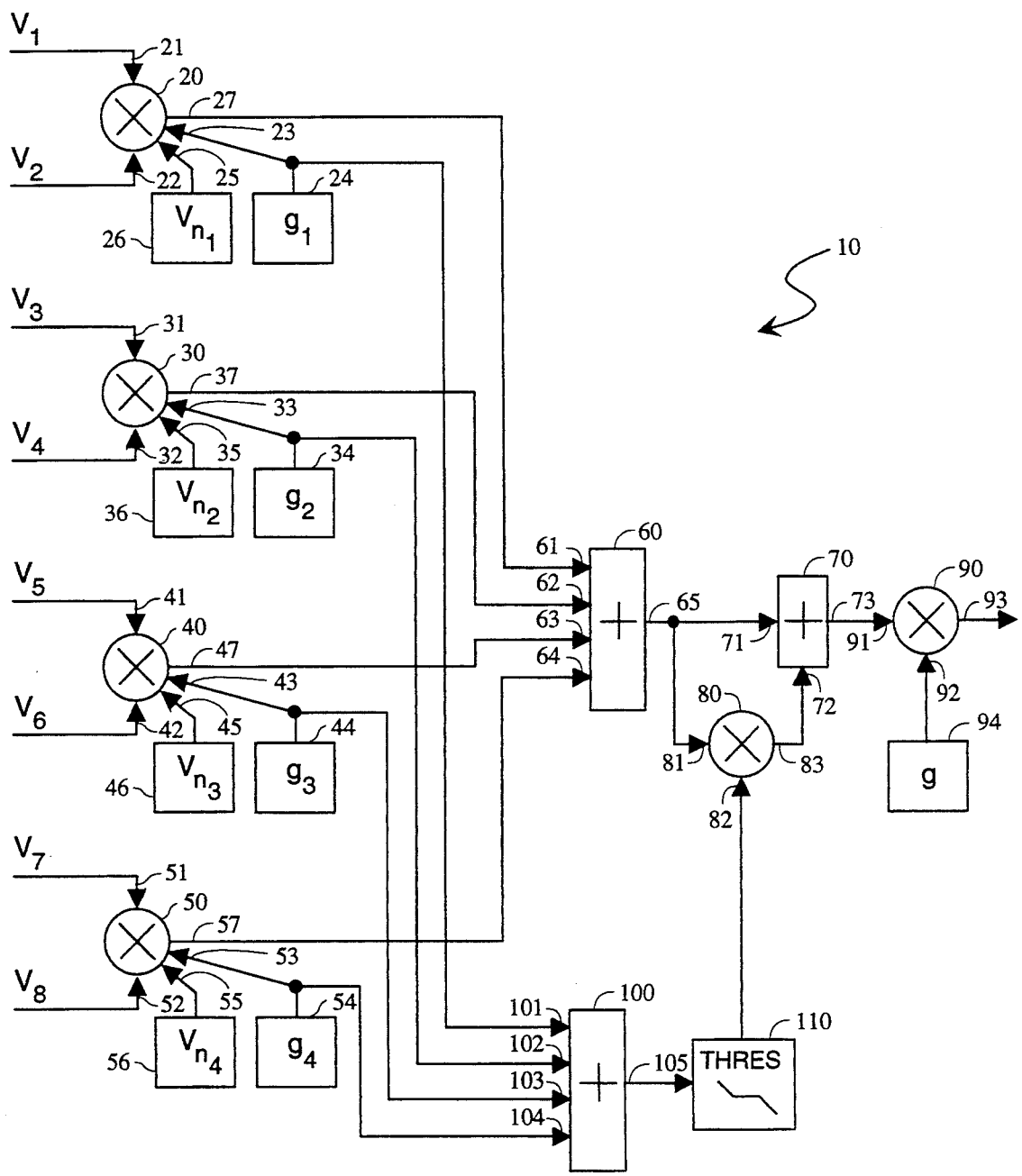
FIG. 1 sets forth a block diagram of the present invention waveform synthesizer.

FIG. 1 sets forth a block diagram of a geometry correction waveform synthesizer constructed in accordance with the present invention and generally referenced by numeral 10. Waveform synthesizer 10 includes a DC controlled multiplier 20 having a pair of balanced inputs 21 and 22 coupled to respective sources of complementary signals V1 and V2 respectively. Multiplier 20 further includes a gain signal input 23 coupled to a source of gain control voltage 24, a null input 25 coupled to a source of null voltage 26, and an output 27.

Waveform synthesizer 10 further includes additional DC controlled multipliers 30, 40 and 50 identical to multiplier 20. Thus, DC controlled multiplier 30 includes a pair of balanced inputs 31 and 32 coupled to sources of complementary signals V3 and V4. A gain signal input 33 and a null signal input 35 coupled to sources 34 and 36 respectively and an output 37. Multiplier 40 includes balanced inputs 41 and 42 coupled to sources of complementary signals V5 and V6, a gain control input 43 and a null signal input 45 coupled to sources 44 and 46 respectively, and an output 47. Similarly, multiplier 50 includes balanced inputs 51 and 52 coupled to sources of complementary signals V7 and VS, a gain input 53 and a null input 55 coupled to sources 54 and 56 respectively, and an output 57. An adder circuit 60 includes a plurality of input 61, 62, 63 and 64 coupled respectively to outputs 27, 37, 47 and 57 of multipliers 20, 30, 40 and 50 and an output 65. An adder 70 includes an input 71 coupled to output 65 of adder 60 and an input 72. A multiplier 80 includes an input 81 coupled to output 65 of adder 60, an input 82, and an output 83 coupled to input 72 of adder 70. Adder 70 further includes an output 73 coupled to an input 91 of a multiplier 90. Multiplier 90 further includes an input 92 coupled to a source of gain control voltage 94 and an output 93.

An adder circuit 100 includes a plurality of inputs 101, 102, 103 and 104 coupled to gain control voltage sources 24, 34, 44 and 54 respectively and an output 105. A threshold circuit 110 couples output 105 of adder 100 to input 82 of multiplier 80.

In operation, and by way of overview, multipliers 20, 30, 40 and 50 each receive pairs of complementary geometry correction signals which are combined in proportions controlled by the individual DC gain voltages supplied by voltage sources 24, 34, 44 and 54 respectively. The resulting output signals are applied to adder 60 and combined therein to produce a resulting geometry correction waveform signal having the respective components provided by multipliers 20, 30, 40 and 50. The individual gain control voltages produced by gain control sources 24, 34, 44 and 54 are combined in adder 100 to produce a resulting combination gain control signal which is threshold limited by limiter 110 and used to control multiplier 80. Multiplier 80 and adder 70 combine to form a gain control stage which adjusts the amplitude of composite correction waveform coupled from adder 60 to multiplier 90. Multiplier 90 receives an overall gain control voltage from source 94 which is used to set the complete correction amplitude to be applied to the scan system (not shown).

More specifically, multiplier 20 comprises a DC controlled multiplier to which complementary signals are applied at inputs 21 and 22 and which is set forth below in FIG. 3 in greater detail. Suffice it to note here, however, that multiplier 20 functions generally to combine the complementary signal inputs from sources V1 and V2 in relative proportions selected to produce an output signal having the polarity and amplitude needed for the geometry correction characteristic which responds to the type of signals V1 and V2. Under normal conditions, multiplier 20 is initially adjusted by setting gain control voltage source 24 at its mid-range voltage condition and thereafter adjusting null voltage source 26 to produce a null or zero output at output 27. Under most circumstances, once null voltage source 26 has been adjusted to, in effect, balance multiplier 20, gain control source 24 is adjusted to provide the desired amplitude and polarity of correction signal by varying the relative proportions of complementary signals V1 and V2.

Figure 2A:
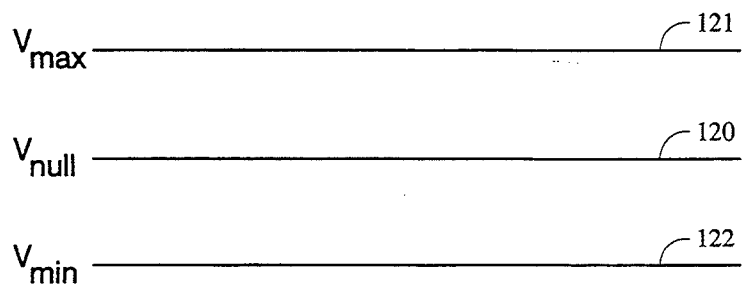
FIGS. 2A-2C sets forth exemplary waveforms processed by the present invention synthesizer.
Figure 2B:
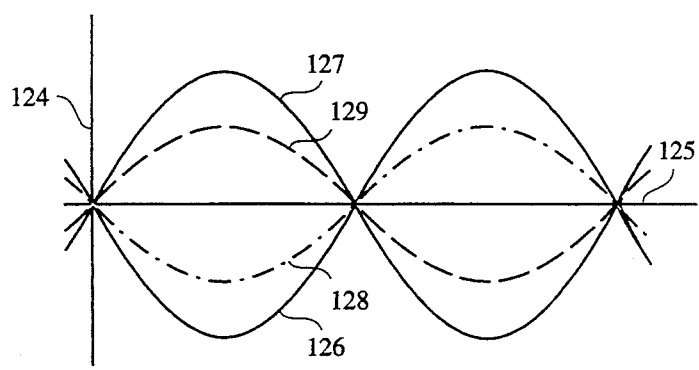

For example, and with temporary reference to FIGS. 2A and 2B with gain control 24 set at its center value, the voltage provided by null source 26 tends to center the operating points of multiplier 20 at null voltage 120 in FIG. 2A equally spaced between maximum voltage 121 and minimum voltage 122. Once this setting has been achieved, multiplier 20 is controlled entirely by gain control source 24. If, for example, complementary input signals V1 and V2 comprise opposite phase sine wave signals such as signals 126 and 127 in FIG. 2B, the center range setting of gain control source 24 produces an output at output 27 comprising equal amplitude components of oppositely phased sine waves 126 and 127. The result at output 127 is a null or straight line signal condition 125. At the other extreme, the adjustment of gain control source 24 to the maximum setting in one direction causes the output signal of multiplier 20 to correspond to one input such as sine wave 126 while adjustment in the opposite direction produces an output corresponding to the other input signal such as sine wave 127. Between the two extreme conditions, the polarity and amplitude of output signal is controlled by intermediate settings of gain control source 24. For example, sine wave 128 results from adjustment of gain control source 24 in a manner favoring the coupling of sine wave 126 while sine wave 129 results from adjustment of gain control source 24 in a manner favoring sine wave 127.

Returning to FIG. 1, multipliers 30, 40 and 50 function in the same manner to provide output signals having polarity and amplitude characteristics which are controlled by their respective gain control sources 34, 44 and 54. In the application of the present invention waveform synthesizer, the number of multiplier and complementary signal sources used is selected in accordance with the required degrees of correction to be implemented. Thus, circuit 10 may be expanded to utilize a greater number of multipliers or contracted to utilize fewer multipliers without departing from the spirit and scope of the present invention.

The respective correction signal outputs of multipliers 20, 30, 40 and 50 are combined within adder 60 to produce a combined or composite correction signal output which is then applied to the gain control circuit formed by adder 70 and multiplier 80. This gain control function is provided as a directly coupled portion of the composite signal from adder 60 is applied to one input of adder 70 while a variable amplitude component is coupled to the remaining input of adder 70 through multiplier 80. The amplitude coupled to input 72 of adder 70 is controlled by the signal applied to input 82 of multiplier 80.

In accordance with an important aspect of the present invention, the gain control voltages provided by gain control sources 24, 34, 44 and 54 are combined by adder 100 to produce a total gain control voltage which is applied to a threshold filter 110. With temporary reference to FIG. 2C, the transfer function of filter 110 is set forth therein and generally referenced by numeral 130. In the transfer characteristic of FIG. 2C, input values are plotted along horizontal axis 131 while output values are plotted along vertical axis 132. Thus, transfer characteristic 130 defines a lower limit 133 and an upper limit 134 on either side of the origin or intersection of input axis 131 and output access 132. Transfer characteristic 130 maintains a zero transfer characteristic shown by straight line 135 between lower limit 133 and upper limit 134. For input values exceeding upper limit 134, transfer characteristic 130 exhibits a negative going linear transfer characteristic portion 137. Conversely, for input values below lower limit 133, transfer characteristic 130 exhibits a positive going linear characteristic 136. Thus, transfer characteristic 130 provides no effect for input values between lower limit 133 and upper limit 134 while producing negative going output for inputs in excess of upper limit 134 and positive going output for inputs less than lower limit 133.

Figure 2C:
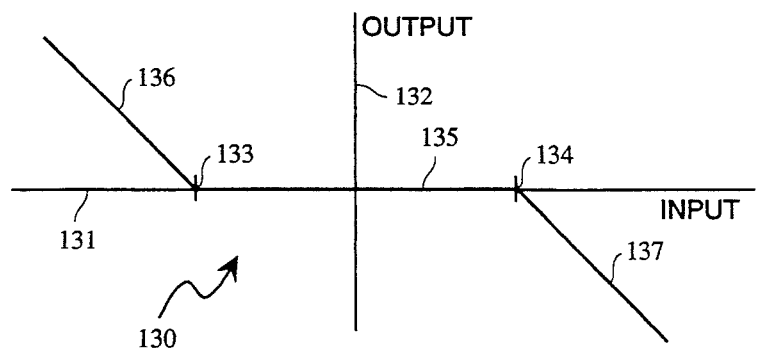

Returning to FIG. 1, the transfer characteristic described in FIG. 2C and applied by threshold filter 110 provides an amplitude control input to multiplier 80 which is zero so long as the combined gain control voltages of multipliers 20, 30, 40 and 50 remains between the predetermined upper and lower limits. With this zero input to multiplier 80, no additional component of the composite signal from adder 60 is coupled through multiplier 80 and the output of adder 70 corresponds to the output of adder 60. If, however, the combined gain control voltage at the output of adder 100 exceeds the upper limit, a negative voltage is applied to input 82 of multiplier 80 producing a subtractive component of the composite signal output of adder 60. The effect of this subtractive component when applied to adder 70 is to reduce the composite correction signal coupled through adder 70 and applied to multiplier 90. Conversely, in the event the combined gain control voltages from multipliers 20, 30, 40 and 50 is less than the lower limit of the transfer characteristic of threshold filter 110, a positive output is coupled to multiplier 80 which in turn applies an additive component to adder 70 thereby increasing the composite correction signal output of adder 70 applied to multiplier 90.

Thus, a compensating gain control is operative upon the composite geometry correction signal produced by multipliers 20, 30, 40 and 50 which responds to insufficient or excessive correction signal amplitude while remaining inoperative under normal signal conditions. Multiplier 90 responds to gain control voltage source 94 to vary the amplitude of composite correction signal at output 93 directly in response to the gain control voltage from source 94.

In its anticipated operation, gain control sources 24, 34, 44 and 54 are adjusted to provide the appropriate proportional correction signal components to properly address the geometric correction required within the display scan system. The automatic gain control provided by adder 100, threshold filter 110, multiplier 80 and adder 70 operates automatically to provide in effect an automatic gain control system which maintains the composite geometry correction signal within a predetermined amplitude range. Finally, gain control 94 is adjusted to provide overall amplitude control of the composite correction signal which in turn controls the extent of geometry correction applied to the scan system of the host display.

Figure 3:
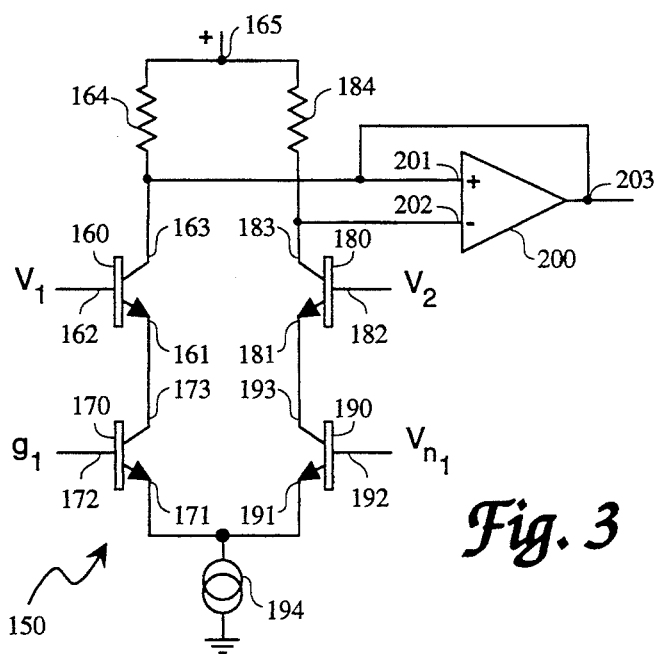
FIG. 3 sets forth a schematic diagram of a portion of the waveform synthesizer of FIG. 1.

FIG. 3 sets forth a schematic diagram of the circuit used for DC controlled multipliers 20, 30, 40 and 50 in FIG. 1. By way of overview, the circuit of FIG. 3 comprises a balanced differential amplifier having a constant current source and four signal inputs controlling the two differential pairs of transistors therein.

More specifically, circuit 150 includes an NPN transistor 160 having an emitter 161, a base 162 and a collector 163 coupled to a source of operating supply 165 by a collector load resistor 164. An NPN transistor includes an emitter 171 coupled to ground by a constant current source 194, a base 172 and a collector 173 coupled to emitter 161. An NPN transistor 180 includes an emitter 181, a base 182 and a collector 183 coupled to operating supply source 165 by a collector load resistor 184. An NPN transistor 190 includes an emitter 191 coupled to ground by constant current source 194, a base 192, and a collector 193 coupled to emitter 181. An operational amplifier 200 includes an input 202 coupled to collector 183 of transistor 180, an input 201 coupled to collector 163 of transistor 160 and an output 203. Amplifier 200 further includes a feedback coupling between output 203 and input 201.

As described above, the circuit of FIG. 3 is typical of multipliers 20, 30, 40 and 50. For purpose of illustration, it will be assumed that the circuit of FIG. 3 is coupled within the circuit of FIG. 1 as multiplier 20. It will be apparent to those skilled in the art that corresponding connections to the circuit of FIG. 3 are used to provide multipliers 30, 40 and 50 in the circuit of FIG. 1. Thus, bases 162 and 182 of transistors 160 and 180 are coupled to sources of complementary correction signals V1 and V2. Bases 172 and 192 of transistors 170 and 190 respectively are coupled to gain control source 24 and null voltage source 26 respectively. Output 203 of amplifier 200 is coupled to input 61 of adder 60.

In operation, multiplier 150 is initially adjusted by centering gain control source 24 within its operable range and thereafter adjusting null voltage source 26 to balance circuit 150 and provide equal amplitude complementary signals at collectors 163 and 183. In the preferred operation of circuit 150, equal amplitudes of complementary correction signals are applied to base 162 and 182. However, in the event unequal correction signals are applied, the null voltage applied to base 192 may be adjusted to compensate and provide equal amplitude complementary signals for application to amplifier 200. Amplifier 200 combines the complementary signals at inputs 201 and 202 to produce a combined output signal which, as mentioned above, is applied to adder 60. Thereafter, the null voltage applied to base 192 remains undisturbed and the output of circuit 150 is controlled solely by adjustment of the gain control voltage applied to base 172. In the event the gain control voltage applied to base 172 is increased, the conduction of transistor 170 increases correspondingly. The increased conduction of transistor 170 provides increased conduction of transistor 160 and a greater amplitude of correction signal V1 at collector 163. Correspondingly, the increased conduction of transistors 160 and 170 together with constant current source 194 produces a reduced conduction of transistors 190 and 180 causing a reduced amplitude of correction signal V2 at collector 183. With a greater amplitude of correction signal V1 and a reduced amplitude of correction signal component V2 applied to amplifier 200, the output signal at output 203 which is applied to adder 60 (in FIG. 1) assumes the character of correction signal component V1. The amplitude of this correction signal is controlled by the relative amplitudes of output signals at collectors 163 and 183 which in turn is controlled by the gain control voltage at base 172. At the extreme, the adjustment of gain control voltage at 172 to its maximum turns transistors 160 and 170 on maximally while turning transistors 180 and 190 off and producing a maximum V1 signal output and a zero V2 output. With temporary reference to FIG. 2B, the former circumstance corresponds to waveform 128 while the latter extreme circumstance corresponds to waveform 126.

Conversely, in the event the control applied to base 172 is reduced below the center value, the conductions of transistor 160 and 170 are reduced while the conductions of transistors 180 and 190 are increased. This in turn produces a greater amplitude V2 signal at collector 183 and a reduced amplitude V1 signal at collector 163. The combination of these signals within amplifier 200 produces an output signal having the characteristic of correction signal component V2 and an amplitude controlled by the gain control voltage at base 172. With temporary reference to FIG. 2B, this circumstance corresponds to curve 129. In the event the gain control voltage at base 72 is reduced to a minimum, transistors 160 and 170 are nonconducting while transistors 180 and 190 conduct maximally producing a zero V1 component output at collector 163 and a maximum V2 component output at collector 183 which in turn produces the output signal of amplifier 200 corresponding to curve 127 in FIG. 2B.

What has been shown is a geometry correction waveform synthesizer for use in a cathode ray tube display which provides individual gain control adjustments of the relative amplitudes of a plurality of geometry correction signals to produce a composite correction signal. A threshold gain control system combines the total gain control voltages used to control the individual components to maintain the composite correction signal amplitude within a predetermined range. An overall gain control is provided to adjust the degree of geometry correction as required. As a result, the present invention system is able to provide individual component control to produce a composite correction signal which exhibits the appropriate characteristic and thereafter operate upon the composite signal in a manner in which controls the amplitude thereof without disturbing its character.

It will be apparent to those skilled in the art that the present invention system may be implemented using either analog or digital processing techniques or a combination thereof without departing from the spirit and scope of the present invention. Thus, while the DC controlled multipliers of the embodiment shown have been described as analog signal processing circuits, corresponding digital multipliers may be utilized in a digital environment without departing from the spirit and scope of the present invention. Correspondingly, the various adders and multipliers used in the present invention system to process the correction signals may also be implemented as either digital or analog processing systems.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A method for producing a geometry control signal comprising the steps of:
   receiving a plurality of complementary pair correction signals;
   forming a plurality of correction signal components from each of said pairs of correction signals;
   combining said signal components to form a composite correction signal;
   controlling the amplitude of said composite correction signal to form a gain controlled composite correction signal; and
   adjusting the amplitude of said gain controlled composite correction signal applied to a scan system.

2. The method of claim 1 wherein said step of forming includes combining each of said complementary pair signals.

3. The method of claim 2 wherein said step of combining each of said complementary pair signals includes providing a component gain control signal for each of said pairs and responding to said component gain control signal for each of said pairs.

4. The method of claim 3 wherein said step of controlling includes the steps of:
   combining said component gain control signals for each of said pairs to form an automatic gain control signal; and
   varying said gain controlled composite correction signal in response to said automatic gain control signal.

5. The method of claim 4 wherein said step of varying includes the steps of:
   establishing an upper limit and a lower limit for said automatic gain control signal; and
   providing reduction of said automatic gain control signal above said upper limit and increase of said automatic gain control signal below said lower limit.

6. The method of claim 5 wherein said step of providing includes the step of producing neither reduction nor increase of said automatic gain control signal above said lower limit and below said upper limit.

7. A method for producing a geometry control signal comprising the steps of:
   forming a plurality of correction signal components each having amplitudes responsive to a gain control signal;
   combining the gain control signals used in said forming step to form a sum of said gain control signals;
   combining said correction signal components to form a composite correction signal; and
   controlling the amplitude of said composite correction signal in response to said sum of said gain control signals.

8. The method of claim 7 wherein said step of controlling includes changing said amplitude solely outside a predetermined amplitude range.

9. For use in producing a geometry control signal, a synthesizer comprising:
   means for receiving a plurality of complementary pair correction signals;
   means for forming a plurality of correction signal components from each of said pairs of correction signals;
   means for combining said signal components to form a composite correction signal;
   means for controlling the amplitude of said composite correction signal to form a gain controlled composite correction signal; and
   means for adjusting the amplitude of said gain controlled composite correction signal applied to a scan system.

10. A synthesizer as set forth in claim 9 wherein said means for forming includes means for combining each of said complementary pair signals.

11. A synthesizer as set forth in claim 10 wherein said means for combining each of said complementary pair signals includes means for providing a component gain control signal for each of said pairs and means for responding to said component gain control signal for each of said pairs.

12. A synthesizer as set forth in claim 11 wherein said means for controlling includes:
   means for combining said component gain control signals for each of said pairs to form an automatic gain control signal; and
   means for varying said gain controlled composite correction signal in response to said automatic gain control signal.

13. A synthesizer as set forth in claim 12 wherein said means for varying includes:
   means for establishing an upper limit and a lower limit for said automatic gain control signal; and
   means for providing reduction of said automatic gain control signal above said upper limit and increase of said automatic gain control signal below said lower limit.

14. A synthesizer as set forth in claim 13 wherein said means for providing includes means for producing neither reduction nor increase of said automatic gain control signal above said lower limit and below said upper limit.

15. For use in producing a geometry control signal, a synthesizer comprising:
   means for forming a plurality of correction signal components each having amplitudes responsive to a gain control signal;
   signal means for combining the gain control signals used by said means for forming a sum of all gain control signals;
   means for combining said correction signal components to form a composite correction signal; and
   means for controlling the amplitude of said composite correction signal in response to said sum of said gain control signals.

16. A synthesizer as set forth in claim 15 wherein said step of controlling includes changing said amplitude solely outside a predetermined amplitude range.

* * * * *